United States Patent
Bae et al.

(10) Patent No.: US 10,525,457 B2
(45) Date of Patent: Jan. 7, 2020

(54) ANION EXCHANGE MEMBRANES AND POLYMERS FOR USE IN SAME

(71) Applicant: Rensselaer Polytechnic Institute, Troy, NY (US)

(72) Inventors: Chulsung Bae, Cohoes, NY (US); Angela Dee Mohanty, Clifton Park, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 0 days.

(21) Appl. No.: 16/351,989

(22) Filed: Mar. 13, 2019

(65) Prior Publication Data

US 2019/0308185 A1    Oct. 10, 2019

Related U.S. Application Data

(63) Continuation of application No. 15/326,538, filed as application No. PCT/US2015/041487 on Jul. 22, 2015, now Pat. No. 1,027,424.

(60) Provisional application No. 62/027,497, filed on Jul. 22, 2014.

(51) Int. Cl.

| | |
|---|---|
| *B01J 41/14* | (2006.01) |
| *H01M 8/083* | (2016.01) |
| *C08F 8/24* | (2006.01) |
| *C08F 8/04* | (2006.01) |
| *C08F 8/44* | (2006.01) |
| *C25B 13/08* | (2006.01) |
| *H01M 8/103* | (2016.01) |
| *H01M 8/1023* | (2016.01) |
| *C08F 8/42* | (2006.01) |
| *H01M 8/1018* | (2016.01) |

(52) U.S. Cl.
CPC ............. *B01J 41/14* (2013.01); *C08F 8/04* (2013.01); *C08F 8/24* (2013.01); *C08F 8/42* (2013.01); *C08F 8/44* (2013.01); *C25B 13/08* (2013.01); *H01M 8/083* (2013.01); *H01M 8/103* (2013.01); *H01M 8/1023* (2013.01); *H01M 2008/1095* (2013.01); *Y02P 70/56* (2015.11)

(58) Field of Classification Search
CPC ........ C08F 8/44; C25B 136/08; H01M 8/103; H01M 8/083; H01M 8/1023; B01J 41/14
See application file for complete search history.

(56) References Cited

U.S. PATENT DOCUMENTS

2006/0089510 A1*  4/2006  Panambur ............... C07C 39/15
                                                           562/400

OTHER PUBLICATIONS

Hibbs et al. "Alkaline Stability of Poly(phenylene)-Based Anion Exchange Membranes with Various Cations", Journal )f Polymer Science, Part B: Polymer Physics 2013, 51, pp. 1736-1742. (Year: 2013).*

Zeng et al., "Anion exchange membranes based on quatemized polystyrene-block-poly(ethylene-ran-butylene)-block-)olystyrene for direct methanol alkaline fuel cells", Journal of Membrane Science, 349 (2010) pp. 237-243. (Year: 2010).*

* cited by examiner

*Primary Examiner* — Peter D. Mulcahy
(74) *Attorney, Agent, or Firm* — Murtha Cullina LLP; Anthony P. Gangemi

(57) ABSTRACT

Embodiments of the invention relate generally to anion exchange membranes and, more particularly, to anion exchange membranes comprising a styrene block copolymer and methods for their manufacture. In one embodiment, the invention provides a polymer according to formula IV, wherein x and y are mol %, QA is or each of $R_1$ and $R_2$ is, independently, a linear alkyl chain or a cyclic alkyl chain, and Z is selected from a group consisting of: a linear alkyl chain, a cyclic alkyl chain, and an alkylene ether chain.

4 Claims, 4 Drawing Sheets

ANION EXCHANGE MEMBRANES AND POLYMERS FOR USE IN SAME

CROSS-REFERENCE TO RELATED APPLICATIONS

This application is a continuation of U.S. patent application Ser. No. 15/326,538, filed Jan. 16, 2017, which is a national stage filing of International Patent Application No. PCT/US2015/041487, filed Jul. 22, 2015, which claims the benefit of U.S. Provisional Patent Application No. 62/027,497, filed Jul. 22, 2014, which is hereby incorporated herein as though fully set forth.

STATEMENT REGARDING FEDERALLY-SPONSORED RESEARCH OR DEVELOPMENT

This invention was made with government support under grant number 0747667 awarded by the National Science Foundation. The government has certain rights in the invention.

BACKGROUND

Alkaline exchange membranes or anion exchange membranes (AEMs) allow for the transportation of anions (e.g., $OH^-$, $Cl^-$, $Br^-$) from the cathode to the anode in an electrochemical reaction. AEMs are a critical component of AEM fuel cells, where hydrogen and oxygen are used to generate electricity, with water as a byproduct. AEMs are also used in water electrolysis, where water is split into hydrogen and oxygen using electricity. In both AEM fuel cells and water electrolysis, hydroxide ions ($OH^-$) are transported through the AEM, along with water molecules. AEMs may also be used, for example, in batteries, sensors, and as actuators.

Known AEMs are generally unsuitable for use in AEM fuel cells or water electrolysis. Many commercially-available AEMs are based on polystyrene, which is generally considered a poor choice for AEM fuel cells or water electrolysis. Other AEM materials contain an arylene ether linkage (—O—) in the mid-chain and a benzyltrimethyl ammonium group in the side-chain. This combination, however, has been found to be chemically unstable and to degrade easily under highly alkaline conditions.

BRIEF DESCRIPTION OF THE INVENTION

In one embodiment, the invention provides a polymer according to formula IX

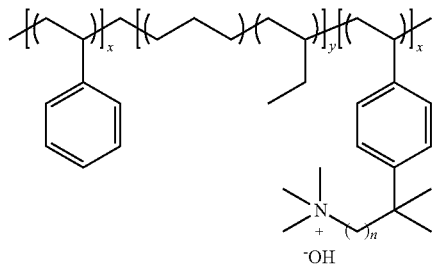

wherein x and y are mol % and n is 1-10.

In another embodiment, the invention provides a polymer according to formula XII

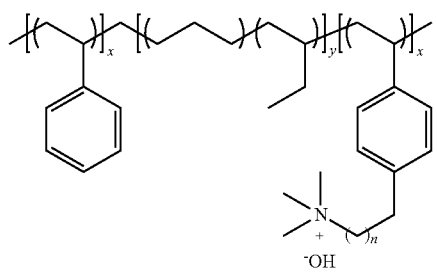

wherein x and y are mol % and n is 1-10.

In still another embodiment, the invention provides a polymer according to formula IV (formula IV)

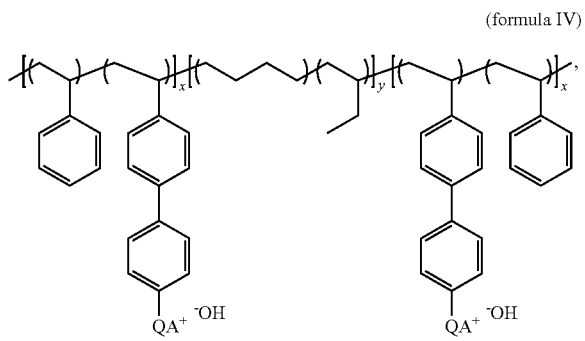

wherein x and y are mol % and n is 1-10, QA is

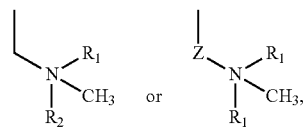

each of $R_1$ and $R_2$ is, independently, a linear alkyl chain or a cyclic alkyl chain, and Z is selected from a group consisting of: a linear alkyl chain, a cyclic alkyl chain, and an alkylene ether chain.

In yet another embodiment, the invention provides an anion exchange membrane comprising at least one polymer selected from a group consisting of:

a polymer of formula IV (formula IV)

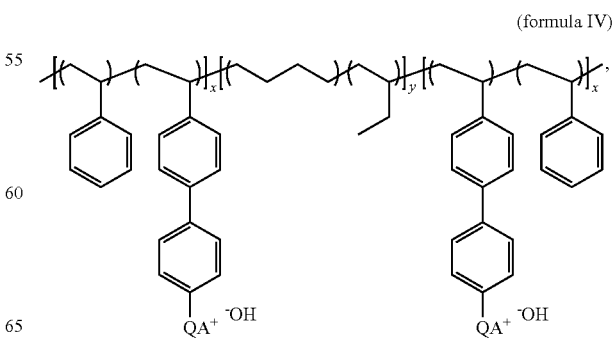

wherein x and y are mol % and n is 1-10, QA is

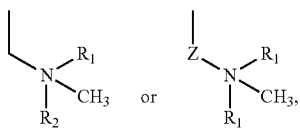

each of $R_1$ and $R_2$ is, independently, a linear alkyl chain or a cyclic alkyl chain, and Z is selected from a group consisting of: a linear alkyl chain, a cyclic alkyl chain, and an alkylene ether chain;

a polymer of compound IX

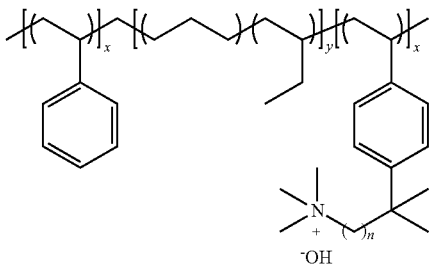

wherein x and y are mol % and n is 1-10; and
a polymer of compound XII

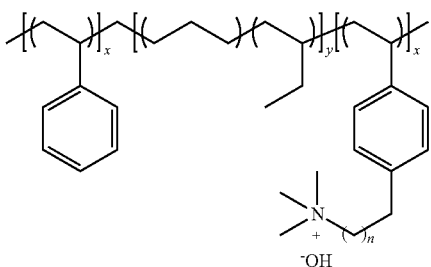

wherein x and y are mol % and n is 1-10.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention.

DETAILED DESCRIPTION OF THE INVENTION

Embodiments of the invention include a new class of quaternized ammonium hydroxide-containing polymers prepared from a styrene-butadiene block copolymer (SEBS). This new class of polymers may be used in alkaline exchange membranes (AEMs), lack an arylene ether linkage in the polymer main-chain, and can prepared with any of a number of quaternized ammonium groups in the polymer side-chains.

Figure 1:
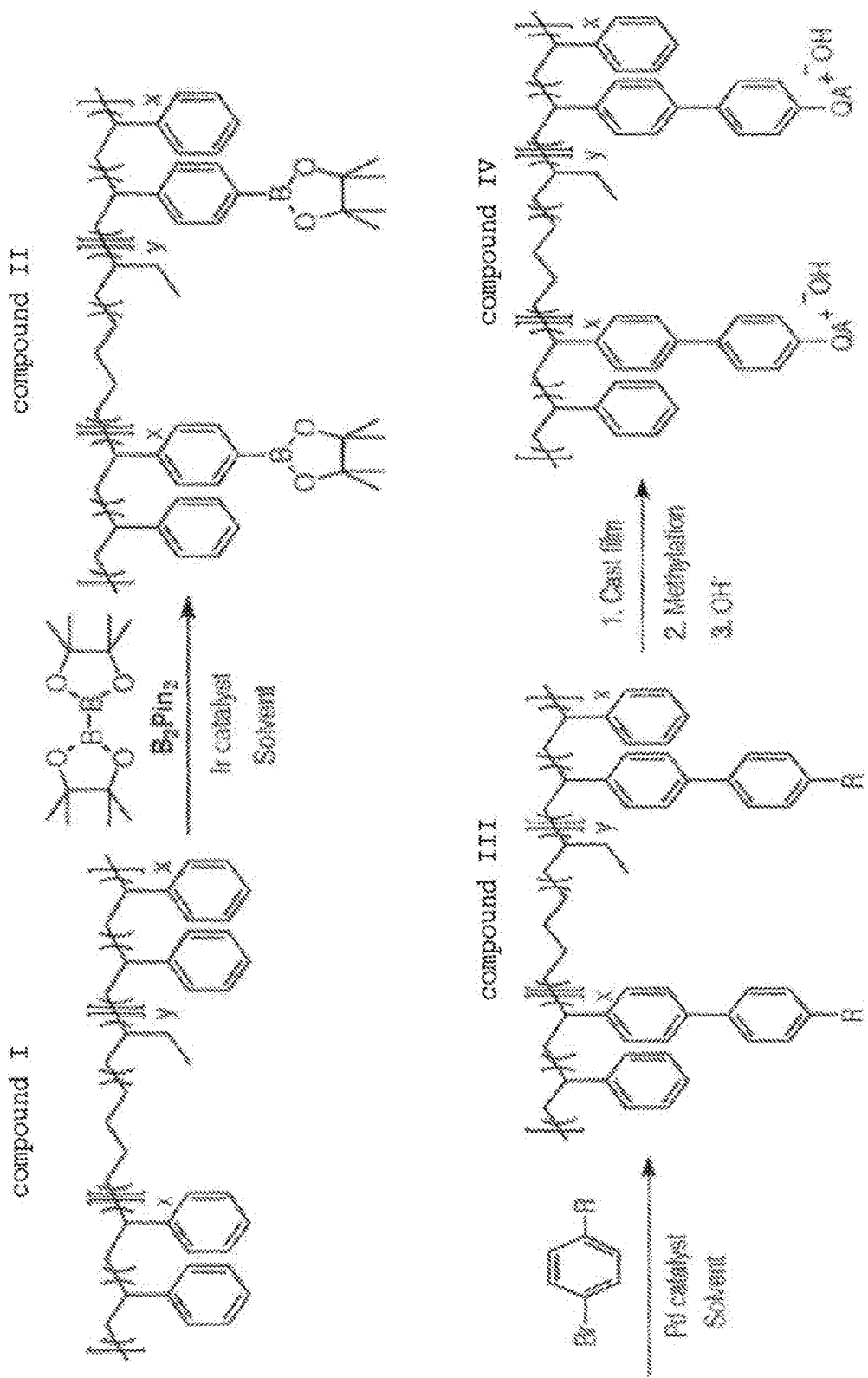
FIG. 1 shows chemical reactions included in an illustrative method of preparing a polymer according to an embodiment of the invention.

FIG. 1 shows chemical reactions involved in a method of forming a quaternized ammonium hydroxide-containing polymer from an SEBS. An SEBS, compound I, is employed where x and y are mol % of each repeating unit and 2x+y=100. For example, in some embodiments of the invention, x is 15 and y is 70. Other values are possible, of course, as will be recognized by one skilled in the art. An iridium-catalyzed borylation is then performed using bis(pinacolato) diboron ($B_2Pin_2$) to introduce a boronic ester group into the aromatic rings of the SEBS, yielding compound II.

A palladium-catalyzed Suzuki coupling reaction is then carried out with an aryl bromide-containing amine to yield compound III. Various amine groups may be substituted for the boronic ester group in compound II, depending on the aryl bromide-containing amine employed. For example, the R group of the aryl bromide-containing amine may be of formula V or formula VI below, wherein each of R.sub.1 and R.sub.2 is, independently, a linear alkyl chain or a cyclic alkyl chain, and Z is selected from a group consisting of: a linear alkyl (e.g., —$(CH_2)_n$—) chain, a cyclic alkyl chain, and an alkylene ether chain (e.g., —$(CH_2CH_2O)_n$—$CH_2CH_2$—).

formula V

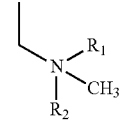

formula VI

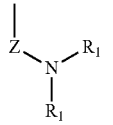

The resulting polymer is then cast into a film, followed by methylation of the amine groups in the polymer and an ion exchange reaction to form compound IV, a quaternary ammonium-containing styrene block copolymer (SEBS-QA) according to one embodiment of the invention. Applicants have found the SEBS-QAs of the invention to be chemically stable and suitable for use in AEMs, even in highly alkaline environments.

Figure 2:
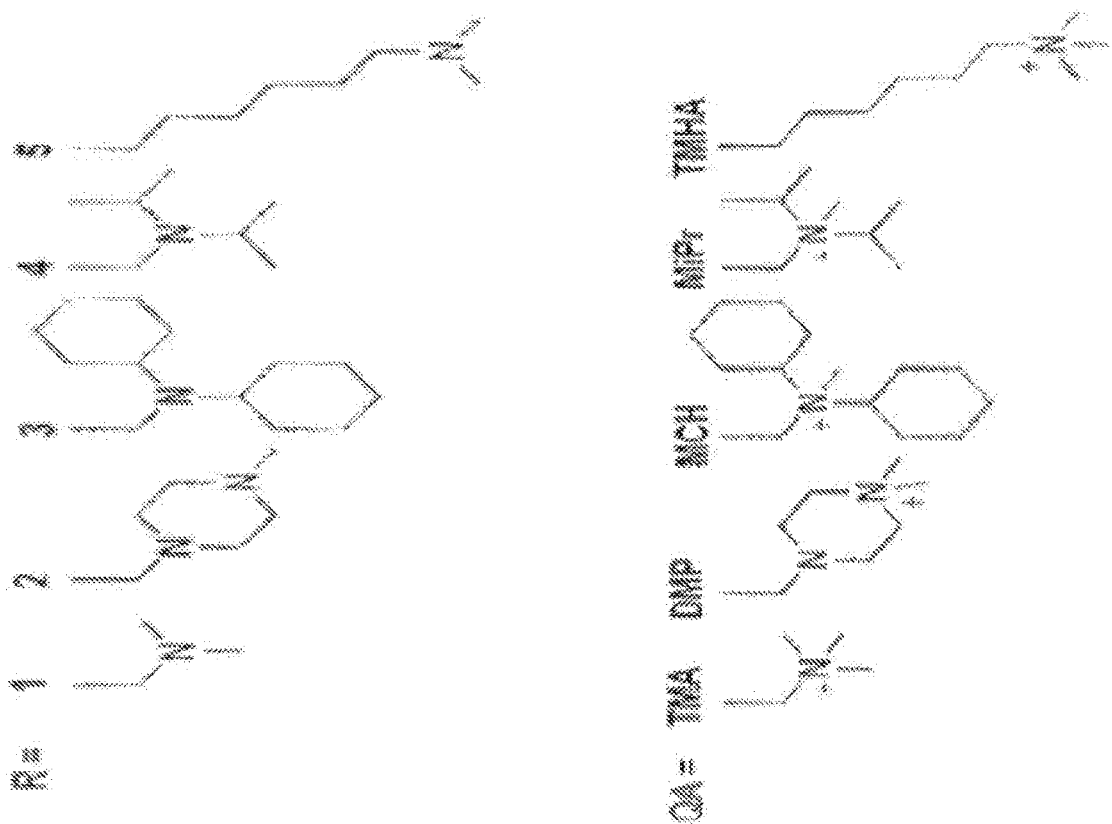
FIG. 2 shows examples of various amine groups that may be incorporated into polymers according to various embodiments of the invention.

Any of a number of quaternary ammonium groups may be incorporated into the SEBS-QAs of the invention, some of which may be sterically hindered and chemically stable. FIG. 2 shows five illustrative R groups and the resulting quaternary ammonium groups. Illustrative quaternary ammonium groups include benzyltrimethylammonium (TMA), dimethylpiperazinium (DMP), benzyldicyclohexylmethylammonium (MCH), benzyldiisopropylmethylammonium (MiPr), trimethylhexylammonium (TMHA), and benzyldimethylhexylammonium (DMHA). Other quaternary ammonium groups may similarly be employed, as will be recognized by one skilled in the art, and are within the scope of the invention. Other suitable quaternary ammonium groups include, for example, alkyl-substituted imidazoliums and alkyl-substituted guadiniums.

Table 1 below shows comparative properties of SEBS-QAs according to embodiments of the invention.

TABLE 1

Representative Data of SEBS-QA.

| Sample | Mol % of amine | Theor. IEC (meq/g) | Expt. IEC (meq/g) | WU (%) | Cl⁻ σ at 30° C. (mS/cm) | $HCO_3^-$ σ at 30° C. (mS/cm) | OH– σ (mS/cm) 30° C. | 60° C. |
|---|---|---|---|---|---|---|---|---|
| SEBS-TMA | 13 | 1.52 | 1.49 | 211 | 13 | 23 | 45 | 89 |
| SEBS-DMP | 13 | 1.39 | 1.20 | 249 | 10 | 13 | 19 | 33 |
| SEBS-MCH | 13 | 1.25 | 0.60 | 52 | 2 | 1 | 3 | 8 |
| SEBS-MiPr | 12.1 | 1.33 | 1.38 | 49 | 2 | 2 | 4 | 10 |
| SEBS-TMHA | 13 | 1.36 | 1.16 | 236 | 9 | 22 | 39 | 59 |
| SEBS-DMHA | 13 | 1.37 | 0.99 | 91 | 3 | 4 | 10 | 22 |

The results in Table 1 show that these SEBS-QAs have high anion conductivity (Cl⁻, $HCO_3^-$, OH⁻), which allows them to be used in a solid electrolyte membrane (in this case AEM) and as an ionomer in the electrodes in electrochemical devices.

Because SEBS exhibits a nano-scale phase-separated morphology, the SEBS-QAs of the invention will similarly exhibit nano-scale ion-transporting channels, allowing for the highly effective conduction of ions.

Figure 3:
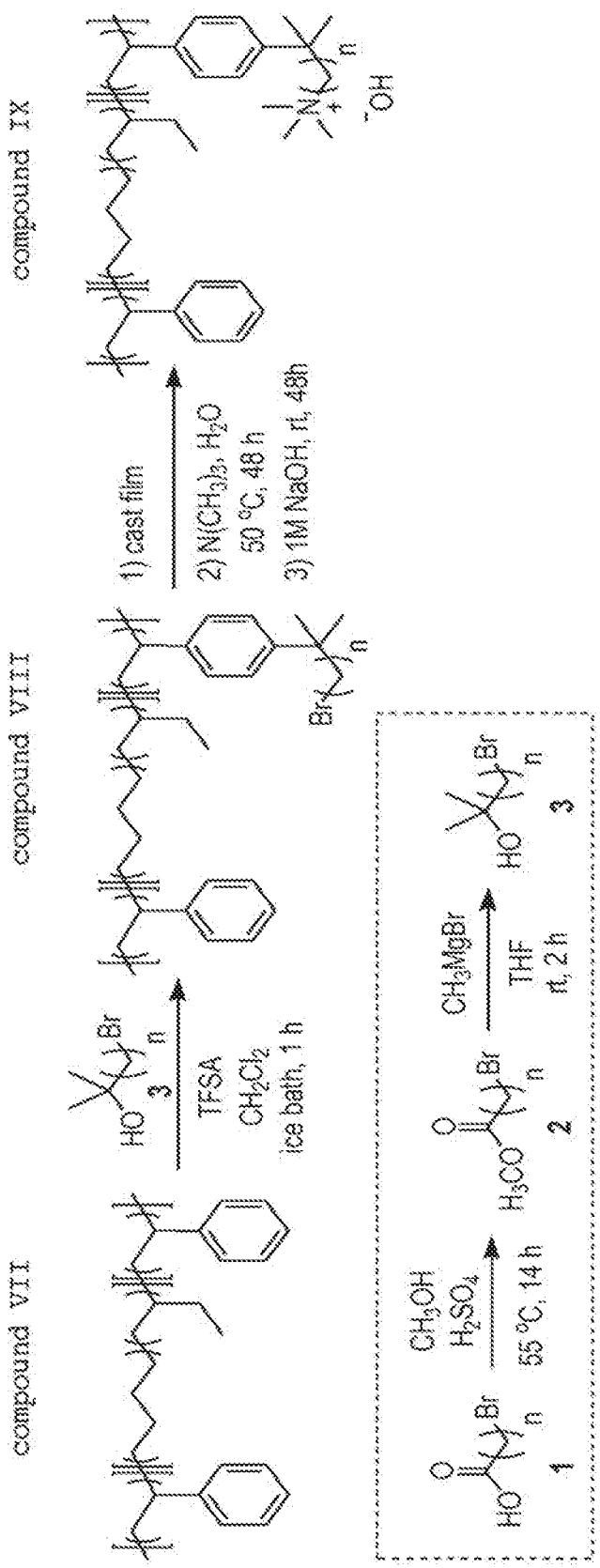
FIG. 3 shows chemical reactions included in a method of preparing a polymer according to another embodiment of the invention.
Figure 4:
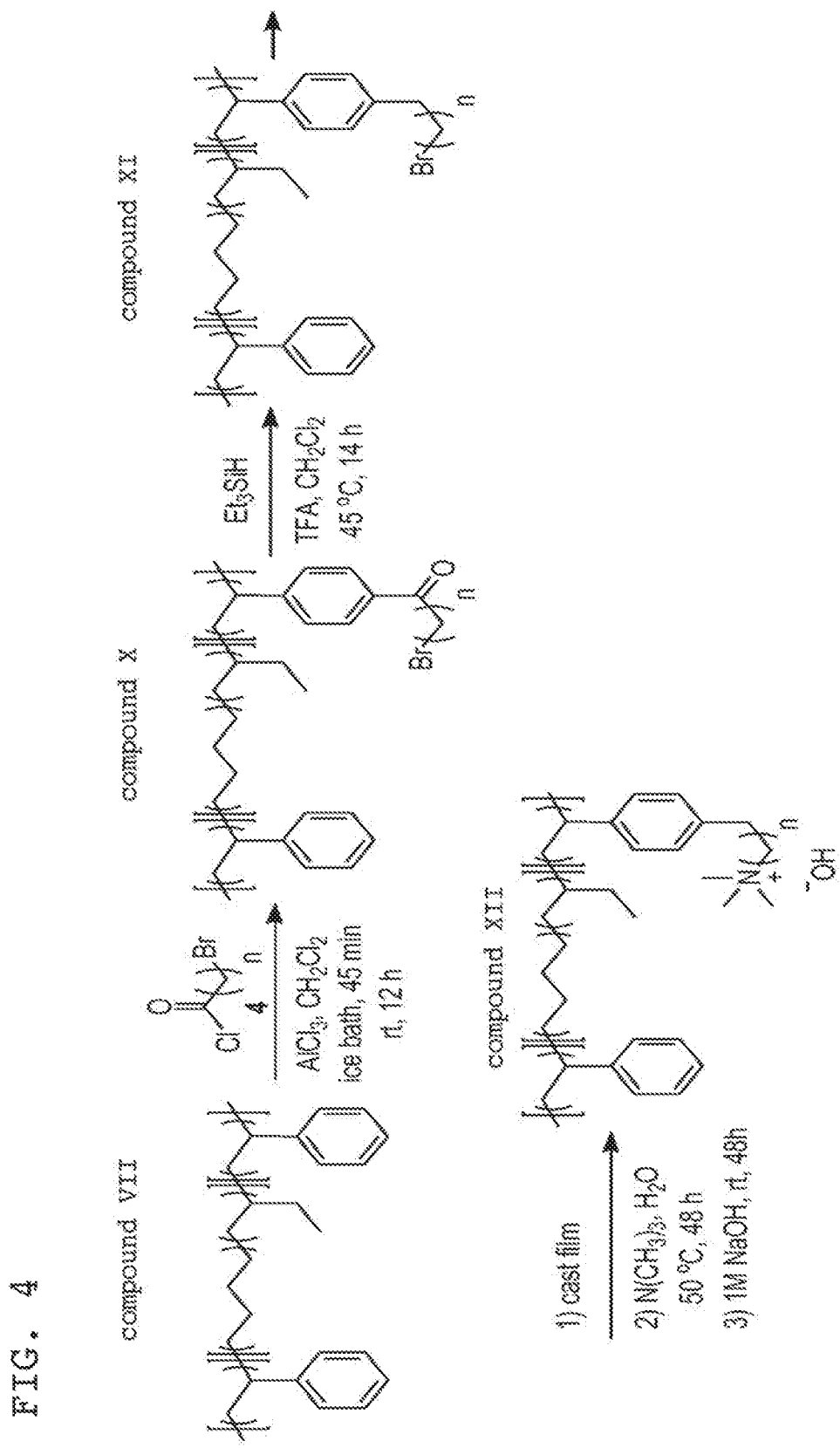
FIG. 4 shows chemical reactions included in a method of preparing a polymer according to still another embodiment of the invention.

According to other embodiments of the invention, SEBS-based anion exchange membranes may be prepared without the use of an expensive transition metal catalyst such as iridium or palladium. FIGS. 3 and 4 show examples of such methods.

The inset within FIG. 3 shows the reactions involved in the esterification of 6-bromohexanoic acid and its subsequent methylation to a tertiary alcohol, which may be used in preparation of a polymer according to the invention. At each stage within the inset, n may be any integer value, although n is typically 1-10 (e.g., 5).

Referring now to the inset of FIG. 3, 6-bromohexanoic acid (compound 1) (0.50 g, 2.56 mmol), methanol (3.8 mL), and concentrated sulfuric acid (0.04 mL) are added to a 25 mL round bottom flask and the mixture stirred at 55° C. for 14 hours. Methanol is then evaporated, e.g., using a rotary evaporator, and the remaining product is diluted with ethyl acetate (15 mL), washed with $NaHCO_3$ (3×10 mL), and dried over $Na_2SO_4$. Ethyl acetate is then removed, e.g., with rotary evaporation, and the product is vacuum dried, yielding the methyl 6-bromohexanoate ester (compound 2). It should be noted that alcohols other than methanol (e.g., ethanol, propanol) can be used for preparation of similar ester compounds.

The methyl 6-bromohexanoate ester (4.8 g, 23.0 mmol) and anhydrous THF (20 mL) are added to a 100 mL round bottom flask under nitrogen and cooled in an ice bath. A mixture of methyl magnesium bromide [($CH_3MgBr$, 3 M in ether) 23 mL, 69 mmol] in anhydrous THF (10 mL) is then added to the flask, e.g., by syringe. The ice bath is removed and the reaction mixture stirred at room temperature for 3 hours. The reaction is then slowly quenched with saturated $NH_4Cl$ (10 mL), water (10 mL), and diethyl ether (20 mL). The resulting product is then extracted with diethyl ether (3×15 mL), dried over $MgSO_4$, and concentrated, e.g., using a rotary evaporator. The resulting tertiary alcohol (compound 3) is a colorless liquid (4.28 g, 92% yield). It should be noted that Grignard reagents or alkyllithium compounds other than methyl magnesium bromide can be used for preparation of similar tertiary alcohols.

Preparation of the polymer according to the embodiment in FIG. 3 begins with an SEBS copolymer (compound VII; 0.50 g, 2.07 mmol styrene units), to which is added compound 3 (1.29 g, 6.22 mmol) in, e.g., a 20 mL vial. The vial is then evacuated and purged with nitrogen.

Anhydrous dichloromethane (5 mL) is added, e.g. by syringe, and the polymer stirred until dissolved. The vial is then cooled in an ice bath and trifluoromethanesulfonic acid (0.55 mL, 6.22 mmol) is added. The reaction is stirred in the ice bath for one hour, after which the reaction is poured into methanol to precipitate the polymer.

The polymer is then filtered, redissolved in chloroform, and precipitated in methanol, yielding the SEBS-alkBr polymer of compound VIII after isolation and vacuum drying at room temperature for 6 hours. In practice, Applicants found 59.3% of the styrene units of compound VIII to be reacted (17.7 mol % alkyl-bromide and 12.2 mol % unfunctionalized styrene units). Molecular weights measured by GPC at 30° C. with THF as the eluent were SEBS-$M_n$=106,315 g/mol (PDI=1.04) and SEBS-alkBr-$M_n$=60,228 g/mol (PDI=2.07). Viscosities measured in toluene at 30° C. were SEBS=0.82 dL/g and SEBS-alkBR=0.68 dL/g.

Next, 0.15 g of compound VIII is dissolved in toluene (3 mL), filtered, cast onto a Teflon plate, and dried under a gentle flow of air at 80° C. The thin SEBS-alkBr film (approximately 30-40 μm thick) is then removed from the plate by immersion in water and immersed in aqueous trimethylamine (45 wt % in water) and heated to 50° C. for 48 hours. The film is then ion exchanged to hydroxide form by immersion in 1 M NaOH at room temperature for 48 hours, yielding compound IX of FIG. 3.

FIG. 4 also shows the reactions involved in preparing an SEBS-based polymer without use of a transition metal catalyst according to another embodiment of the invention. Again, the method begins with an SEBS co-polymer (compound VII; 29.9 mol % styrene units). Compound VII (0.30 g, 4.64 mmol styrene units) and 6-bromohexanoyl chloride (compound 4; 1.49 g, 6.96 mmol, n=5) are added to a 100 mL round bottom flask under nitrogen. Anhydrous dichloromethane (15 mL) is added, e.g., by syringe.

After stirring to dissolve the polymer, the flask is cooled in an ice bath and $AlCl_3$ powder (0.93 g, 6.96 mmol) is added all at once. The mixture is then stirred in an ice bath for 45 minutes and at room temperature for 12 hours. The reaction mixture is then poured into methanol to precipitate the polymer, which is filtered, redissolved in chloroform, and precipitated in methanol to yield the SEBS-acylBr polymer of compound X. After vacuum drying at room temperature for 6 hours, 0.38 g of the polymer of compound X was obtained, in which 100% of the styrene units were reacted (i.e., the polymer contained 29.9 mol % acyl-bromide).

The ketone of the SEBS-acylBr of compound X may then be reduced to yield the SEBS-alkBr of compound XI. To do so, SEBS-acylBr of compound X (0.38 g, 0.91 mmol ketone) is added to a 100 mL round bottom flask, which is evacuated and purged with nitrogen. Anhydrous dichloromethane (19 mL) is added and the solution stirred until the polymer is dissolved. Triethylsilane ($Et_3SiH$; 0.58 mL, 3.64 mmol) and trifluoroacetic acid (0.56 mL, 7.28 mmol) are added, e.g., by syringe, and the mixture stirred in a 45° C. oil bath. After 14 hours, the reaction is poured into methanol to precipitate the polymer, which is filtered, redissolved in chloroform, and precipitated in methanol to yield the SEBS-alkBr of compound XI. After vacuum drying at room temperature for 6 hours, 0.30 g of the polymer of compound XI was obtained in which 100% of the ketone was reduced.

The SEBS-alkBr of compound XI may then be aminated to yield the SEBS-alkTMA of compound XII. To do so, SEBS-alkBr (compound XI; 0.15 g) is dissolved in toluene (3 mL), filtered, cast onto a Teflon plate, and dried under a gentle flow of air at 80° C. The thin SEBS-alkBr film (approximately 30-40 μm thick) is removed from the plate by immersion in water, immersed in aqueous trimethylamine (45 wt % in water) and heated to 50° C. for 48 hours. After 48 hours, the film is rinsed with water and ion exchanged to hydroxide form by immersion in 1 M NaOH at room temperature for 48 hours, yielding the SEBS-alkTMA polymer of compound XII.

Polymers according to embodiments of the invention may be employed in any number of contexts, including, for example, as fuel cell alkaline exchange membranes, fuel cell ionomers, electrolysis alkaline exchange membranes, as actuators, and in any number of battery applications, as will be apparent to one skilled in the art.

One skilled in the art will also recognize, of course, that various changes, additions, or modifications of or to the methods described above may be made without substantively altering the compounds obtained or their characteristics. Such changes, additions, and modifications are therefore intended to be within the scope of the invention.

This written description uses examples to disclose the invention, including the best mode, and also to enable any person skilled in the art to practice the invention, including making and using any devices or systems and performing any related or incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A polymer according to formula IV

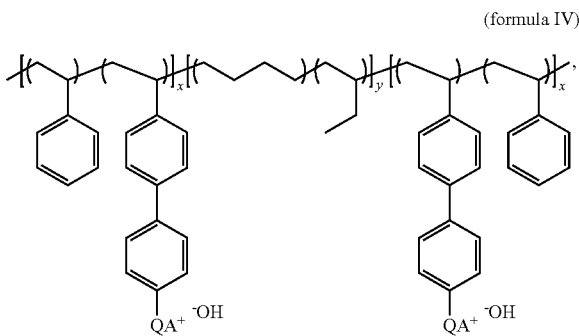

(formula IV)

wherein x and y are mol %, QA is

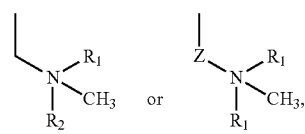

each of R1 and R2 is, independently, a linear alkyl chain or a cyclic alkyl chain, and Z is selected from a group consisting of: a linear alkyl chain, a cyclic alkyl chain, and an alkylene ether chain.

2. A method of preparing the polymer of claim 1, the method comprising:
methylizing a polymer of formula III; and
carrying our an ion exchange reaction on the resulting polymer

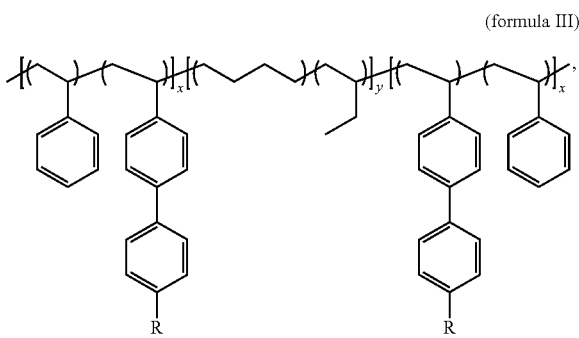

(formula III)

wherein x and y are mol %, QA is

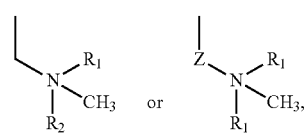

each of R1 and R2 is, independently, a linear alkyl chain or a cyclic alkyl chain, and Z is selected from a group consisting of: a linear alkyl chain, a cyclic alkyl chain, and an alkylene ether chain.

3. The method according to claim 2, further comprising:
preparing the polymer of formula III by:
   carrying out a palladium-catalyzed Suzuki coupling reaction using a polymer of formula II and an aryl bromide-containing amine 4. The method of claim 3, further comprising:
preparing the polymer of formula II by:
   carrying our an iridium-catalyzed borylation using a polymer of formula I and bis(pinacolato)diboron

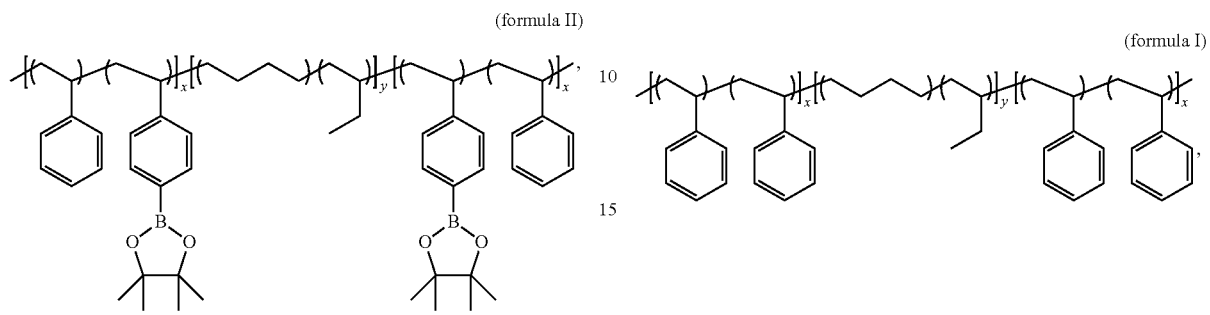

(formula II)

(formula I)

wherein x and y are mol %.

wherein x and y are mol %.

* * * * *

UNITED STATES PATENT AND TRADEMARK OFFICE
CERTIFICATE OF CORRECTION

PATENT NO. : 10,525,457 B2
APPLICATION NO. : 16/351989
DATED : January 7, 2020
INVENTOR(S) : Chulsung Bae and Angela Dee Mohanty Page 1 of 1

It is certified that error appears in the above-identified patent and that said Letters Patent is hereby corrected as shown below:

In the Specification

Please replace Lines 19-22 of Column 1, which is under the heading "STATEMENT REGARDING FEDERALLY-SPONSORED RESEARCH OR DEVELOPMENT" with the following:
This invention was made with government support under grant number DMR1261331 awarded by the National Science Foundation. The government has certain rights in the invention.

Signed and Sealed this
Twenty-second Day of September, 2020

Andrei Iancu
*Director of the United States Patent and Trademark Office*